(12) United States Patent
Oak

(10) Patent No.: US 7,515,077 B2
(45) Date of Patent: Apr. 7, 2009

(54) APPARATUS AND METHOD FOR MONITORING ANALOG PERIPHERAL DEVICES BY A PROCESSING UNIT

(75) Inventor: Sunil S. Oak, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/900,592

(22) Filed: Sep. 12, 2007

(65) Prior Publication Data

US 2008/0062030 A1 Mar. 13, 2008

Related U.S. Application Data

(60) Provisional application No. 60/844,056, filed on Sep. 12, 2006, provisional application No. 60/844,066, filed on Sep. 12, 2006.

(51) Int. Cl.
*H03M 1/00* (2006.01)

(52) U.S. Cl. ........................... 341/141; 341/155

(58) Field of Classification Search .................. 341/141, 341/155, 156, 161, 163
See application file for complete search history.

(56) References Cited

U.S. PATENT DOCUMENTS

| | | | | |
|---|---|---|---|---|
| 4,804,960 A | * | 2/1989 | Fernandes et al. | 341/158 |
| 5,291,197 A | * | 3/1994 | Abe | 341/141 |
| 5,465,345 A | | 11/1995 | Blanc et al. | |
| 5,734,731 A | | 3/1998 | Marx | |
| 5,990,974 A | * | 11/1999 | Amino et al. | 348/588 |
| 6,172,710 B1 | * | 1/2001 | Yoshida | 348/478 |
| 6,327,249 B1 | | 12/2001 | Cookman et al. | |
| 6,515,707 B1 | * | 2/2003 | Lee | 348/513 |
| 7,126,522 B2 | * | 10/2006 | Ogawa | 341/155 |

\* cited by examiner

*Primary Examiner*—Brian Young
(74) *Attorney, Agent, or Firm*—Wad J. Brady, III; Frederick J. Telecky, Jr.

(57) ABSTRACT

In an analog-to-digital converter used to convert and store in buffer registers signals from a plurality of peripheral devices, a mode is provided wherein, for selected peripherals, the most recent converted signal overlays the previously stored signal in the buffer registers.

11 Claims, 2 Drawing Sheets

APPARATUS AND METHOD FOR MONITORING ANALOG PERIPHERAL DEVICES BY A PROCESSING UNIT

This application claims priority under 35 USC §119(e)(1) of Provisional Application No. 60/844,056 (TI-62920, filed Sep. 12, 2006 and Provisional Application No. 60/844,066 (TI-62921), filed Sep. 12, 2006.

RELATED APPLICATION

U.S. Patent Application (TI-62735) invented by Sunil S. Oak and assigned to the assignee of the present application is a related Application.

BACKGROUND OF THE INVENTION

1. Field of the Invention

This invention relates generally to the monitoring of a plurality of analog signals and, more particularly, to the periodic processing of the monitored signals.

2. Description of the Related Art

As more complex automotive and process systems have evolved, the monitoring and control functions have become more complex. Typically, peripheral systems, such as sensor elements, provide status and parameter signals to a processing unit. Based on the status and parameter signals, a processing unit can provide control signals to insure that the status and parameter signals are constrained within acceptable values.

These control systems can elaborate, including whole subsystems that can automatically respond to a situation that requires response. Such a dedicated system can typically be expensive and inflexible. Moreover, the requirements for the status and parameter monitoring can be diverse. The processing unit may need to see every status and parameter signal group, or can review the status of the apparatus only periodically.

The status and parameters signals are frequently analog signals, a format generally incompatible with the requirements of a processing unit. While it would possible to provide each signal source with an analog-to-digital converter, such a system would be too expensive in many applications. More typically, the analog signal groups from a plurality of sources are applied to a single analog-to-digital converter and various techniques then employed to provide the signal groups required by the processing unit to generate timely control signals.

A need has been felt for apparatus and an associated method for providing an improved technique for processing incoming analog signals. It would be a more particular feature of the apparatus and associated method to reduce the chance of identifying and overflow error in the buffer registers of an analog-to-digital converter unit. It would be yet another feature of the apparatus and associated method for provide an analog-to-digital converter unit that can be used efficiently when incoming analog signals need be examined only periodically. It would be still another feature of the apparatus and associated method to provide an analog-to-digital converter unit that can provide for continuous monitoring of a plurality of analog signals or can provide periodic monitoring of a plurality of analog signals.

SUMMARY OF THE INVENTION

The aforementioned and other features are accomplished, according to the present invention, by providing an analog-to-digital converter unit, in which a plurality of analog signals are applied to a selector circuit, the selector circuit determining which of the signals applied to the selector circuit are applied to an analog-to-digital converter. The converted signals are applied to switch unit and stored sequentially in buffer registers. The analog-to-digital converter unit has a second mode of operation in which the most recent signals from selected peripheral units are overwritten on previously stored signals from the selected peripheral device.

Other features and advantages of the present invention will be more clearly understood upon reading of the following description along with the accompanying figures and claims.

DESCRIPTION OF THE PREFERRED EMBODIMENT

1. Detailed Description of the Drawings

Figure 1:
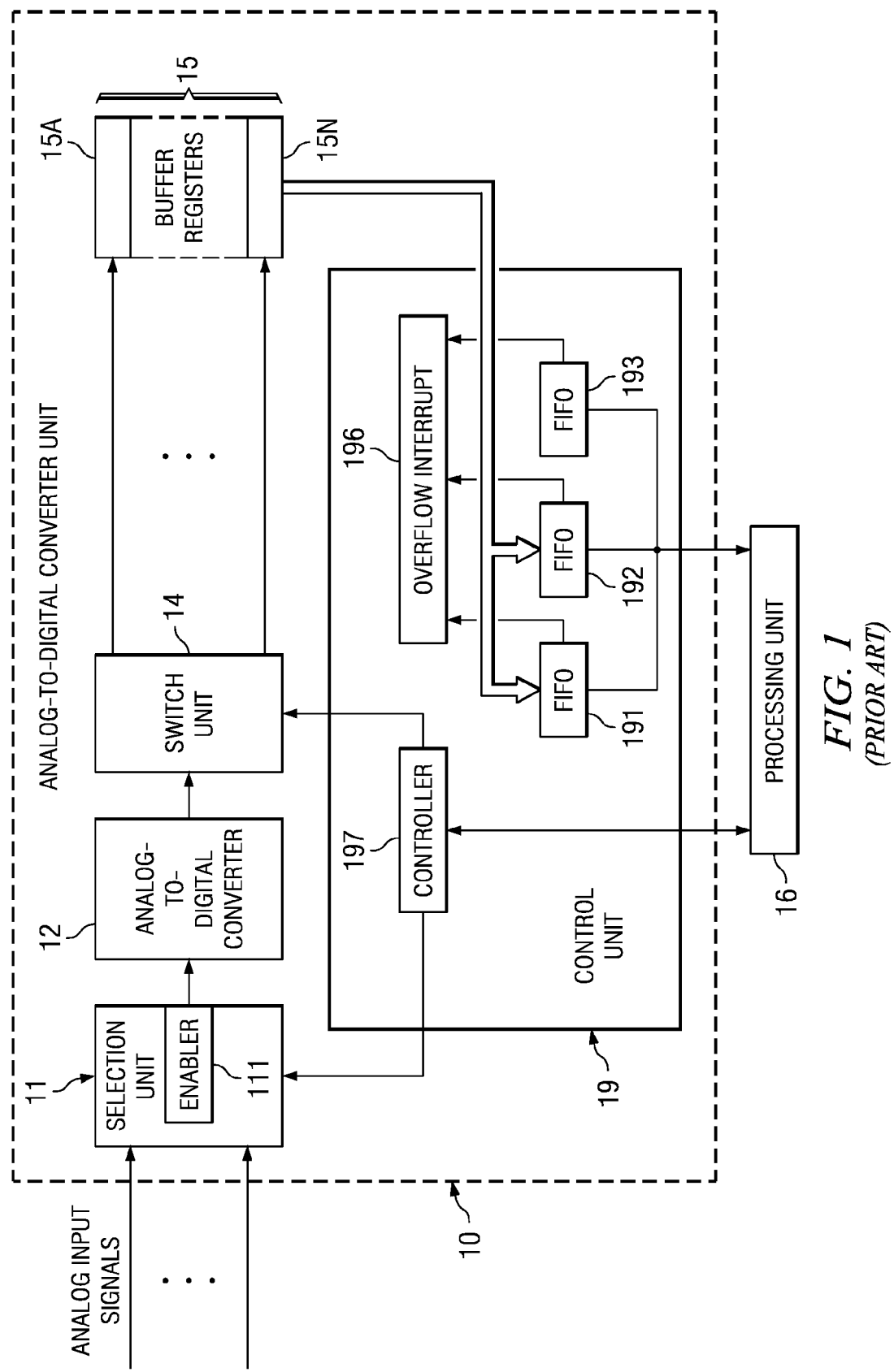
FIG. 1 is a block diagram of a system for monitoring a plurality of analog signals.

Referring to FIG. 1, a block diagram of the prior art apparatus for monitoring a plurality of analog signals is shown. A plurality of analog input signals are applied to selector unit 11. The analog signals can be status or sensor signals that identify a parameter of a peripheral device. In response to control signals from control unit 19, an input signal is selected by the selector unit 11. The control unit 11 also applies an enabling signal to enabler 111. The enabler 111 permits the selected signal to be applied to the input terminal of analog-to-digital converter 12. The analog-to-digital converter 12 converts the applied analog signal to a digital signal representing the same parameter value. The digitized signal is applied to switch unit 14. In response to control signals from control unit 19, digitized signal group is stored in a location in buffer registers storage unit 15. The control unit 19 provides the correlation between the input signal group and the storage location into which the digitized input signal is stored. The signals stored in the buffer storage location can be accessed by processing unit 16. This access is through the control unit 19. In the preferred embodiment, the control unit 19 presents the data stored in the buffer registers 15 as three FIFO units 191, 192, and 193. (Note that FIFO units are not actual storage units, but represent the manner in which the processing unit interacts with the buffer registers 15) The control unit 19 also includes an overflow interrupt register 196. The overflow interrupt register provides an interrupt signal when any of the FIFO units 191, 192, and 193 overflow. This interrupt signal is applied to the processing unit 16 for responsive action to be taken. The controller unit includes a controller 197. The controller 197 correlates the input signal applied to selector 11 with the buffer register 15A-15N into which the converted signal is stored. In addition, the controller 197 exchanges signals with processing unit 16 in order that the processing unit 16 can identify the signal group being retrieved from the analog-to-digital converter unit 10.

An example of the foregoing analog-to-digital unit is found in the Texas Instruments component TMS470PLF221.

The buffer storage unit 10 is able to store multiple sequences of digitized versions of each input signal. Because multiple signals are stored, the possibility of the loss of data because of buffer register overflow is continuing problem. In addition, for many applications of the converter unit, only a most recent version of each incoming signal is required by the processing unit. In this application, the processing unit has far more data than it can use and an overflow condition can result in the loss of data.

Figure 2:
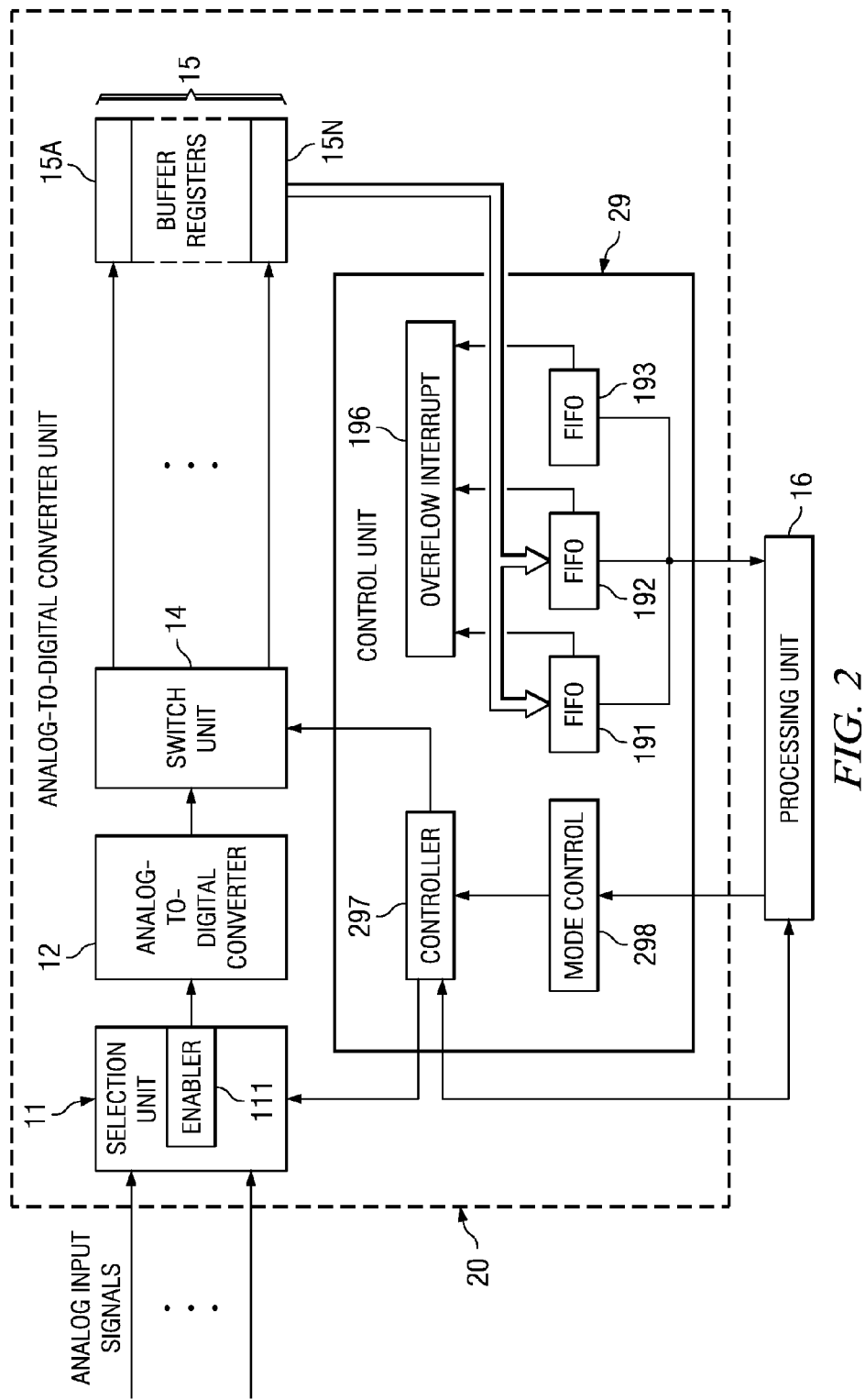
FIG. 2 is a block diagram of a system for monitoring a plurality of analog signals according to the present invention.

Referring to FIG. 2, a block diagram of the present invention is shown. The basic block diagram is similar to FIG. 1. This result is because, in the preferred embodiment, the old and the new mode of operation are present. In the controller unit 29, a mode unit 298 is provided. The mode unit 298 receives a control signal from the processing unit 16 for the analog-to-digital converter unit 20 to be in the second mode of operation. The mode control unit 298, in turn, applies a control signal to the controller 297. Controller 297 then adjusts the correlation between an input signal and the buffer register where the converted input signal is stored so that the new converted input signal is applied to the same address as the previous converted input signal from the same source. That is, the new converted input signal overwrites the buffer register where the previous signal from that source is stored. The processing unit 16 signals to the analog-to-digital converter unit 29 which most recent digitized signal groups is to be transferred to the processing unit 16. In response to the signal from the processing unit 16, the analog-to-digital converter unit 29 transfers the signal group from the buffer register 15 to the processing unit 16.

2. Operation of the Preferred Embodiment

The present invention provides two modes of operation. In the first mode of operation, the analog-to-digital converter unit has a plurality of analog signals applied thereto. Each of the analog signals is converted to a digital signal and the digital signal is transferred to a group of buffer registers in such a manner that, when the digital signal group is applied to a processing unit for processing, the processing unit can identify the source of the analog signals. In this first mode of operation, the goal is to transfer every signal transmitted by the selector unit to be retrieved by the processing unit. In the second mode of operation, the each incoming signal is converter and then the new signal overwrites the previous signal from the same source. An interrupt is present so that on the occurrence of a predetermined condition, the processing unit can process the most recent signal group from the source.

In the situations when the processing unit requests a signal group or signal groups from the buffer registers, the interaction between the controllers in the analog-to-digital converter unit provides the information allowing the processing unit to identify the location of the required signal group.

While the present invention has been described with respect to the embodiments set forth above, the invention is not necessarily limited to these embodiments.

Accordingly, other embodiments, variations and improvements not described herein are not necessarily excluded from the scope of the invention, the scope of the invention being defined by the following claims.

What is claimed is:

1. Apparatus for storing analog signals from a plurality of signal sources to be processed by a processing unit, the apparatus comprising:
   a selector circuit for selecting analog signals from one of the signal sources;
   an analog-to-digital converter, the analog-to-digital converter having the output signal of the selector circuit applied to an input terminal;
   a plurality of storage elements;
   a switch coupled between the output terminal of the analog-to-digital converter and the plurality of storage elements, the selector switch determining into which storage element the output signal of the analog-to-digital converter is stored; and
   a mode control coupled to the switch, such that in a first mode of operation a signal group applied to the storage element overwrites previous converted signal groups from a signal source, and in a second mode of operation each signal group is stored in one of a plurality of memory locations in a first-in-first-out (FIFO) manner without overwriting a previously stored signal group from the signal source.

2. The apparatus as recited in claim 1 further comprising a controller, the controller determining the storage elements into which signal groups are stored.

3. The apparatus as recited in claim 2 wherein the controller provides the processing unit with the identification of each signal group stored in the storage elements.

4. The apparatus as recited in claim 1 wherein the signal sources are peripheral devices.

5. The apparatus as recited in claim 4 wherein the signal groups identify status information for equipment monitored by peripheral devices.

6. A method for processing analog signals from a plurality of signal sources in an analog-to-digital converter unit and a processing unit, the method comprising:
   converting a sequence of analog signals to digital signals; and
   storing the converted analog signals in buffer registers, wherein in a first mode of operation all the input signals from a signal source are stored in a single buffer register, a new signal group overwriting the previous signal groups stored in the buffer register, and in a second mode of operation every signal group is stored in a buffer register in a first-in-first-out (FIFO) manner without overwriting previous signal groups.

7. The method as recited in claim 6 wherein, in response to a communication from the processing unit, the analog-to-digital converter unit transfers a stored signal group identified by the communication, to the processing unit.

8. The method as recited in claim 6 wherein the mode is determined by the processing unit.

9. A system for processing analog signal groups from a plurality of signal sources, the system comprising:
   an analog-to-digital converter unit, the analog-to-digital converter unit including:
   a multiplicity of storage elements;
   a selector for selecting a signal group from one of the plurality of signal sources;
   an analog-to-digital converter for converting a selected signal group to a digital signal group format;
   a switch coupled to the analog to digital converter and applying each signal group to storage element;
   a controller coupled to the selector and to the switch, the controller determining into which storage element a signal group is stored, wherein signal groups from each signal source are stored in a storage element;
   a mode control coupled to the controller, such that in a first mode of operation each signal group overwrites the previously stored signal groups, and in a second mode of operation each signal group is stored in one of a plurality of memory locations in a first-in-first-out (FIFO) manner without overwriting a previously stored signal group from the signal source; and a processing unit, the processing unit retrieving a processed preselected signal group from the storage elements.

10. The system as recited in claim 9 wherein the processing unit determines the mode of operation.

11. The system as recited in claim 9 wherein the controller provides signal group location to the data processing unit.

* * * * *